United States Patent [19]

Zgonik

[11] Patent Number: 4,538,925
[45] Date of Patent: Sep. 3, 1985

[54] THERMAL POWER MEASURING DEVICE

[75] Inventor: Miran Zgonik, Ljubljana, Yugoslavia

[73] Assignee: Avtomontaza Ljubljana n.sub.o. Tovarna Gospodarskih vozil, trgovina in servis motornih vozil, TOZD Tovarna grelnih naprav n.sub.o., Ljubljana, Yugoslavia

[21] Appl. No.: 462,390

[22] Filed: Jan. 31, 1983

[30] Foreign Application Priority Data

Mar. 18, 1982 [YU] Yugoslavia ............................ 591/82

[51] Int. Cl.³ ............................................ G01K 17/06
[52] U.S. Cl. ........................................ 374/39; 73/204; 364/557; 374/15
[58] Field of Search ............................ 374/39, 15, 112; 73/204

[56] References Cited

U.S. PATENT DOCUMENTS

| 4,085,613 | 4/1978 | Richard | 374/39 |
| 4,355,908 | 10/1982 | Weisser et al. | 374/39 |
| 4,415,279 | 11/1983 | Beuse et al. | 73/204 X |

FOREIGN PATENT DOCUMENTS

| 2330498 | 1/1975 | Fed. Rep. of Germany | 374/39 |
| 2700240 | 7/1978 | Fed. Rep. of Germany | |

OTHER PUBLICATIONS

P.C.T. No., WO82/00714, Mar. 4, 1982, Beuse et al., (International Application, PCT), "A Meter for Measuring Quantities of Heat".

Primary Examiner—Daniel M. Yasich
Attorney, Agent, or Firm—Fleit, Jacobson, Cohn & Price

[57] ABSTRACT

The invention discloses a device for measuring thermal power without using movable and wearable elements, which is also appropriate for small flow of thermal power. The device measures the thermal power by means of temperature differences only and is applicable for use with various media. It is constructed so that little of the measuring thermal power is exchanged between two lines, for which reason a temperature gradient is created in the defined cross-section of the body of the measuring device. This temperature gradient is sensed by one or several pairs of sensors, the sensors of a pair always being spaced apart. Due to the exchanged measuring thermal power there appears a temperature difference in the medium being measured between the inlet and the outlet of the same line through the measuring device. This temperature difference is sensed by one or several pairs of sensors. The temperature difference between the inlet and the outlet of the measured object is sensed by one or several pairs of sensors as well. From the responses of all three temperature differences, the thermal power is calculated manually or by means of an electronic unit, the quantity of the heat exchanged is subsequently calculated by time integration as well. Several embodiments and applications of the measuring device are given.

3 Claims, 16 Drawing Figures

THERMAL POWER MEASURING DEVICE

BACKGROUND OF THE INVENTION

1. Field of the Invention

This invention relates to a device for measuring thermal power exchanged between a feed line and a return line of a thermal arrangement, and more particularly to a device in which energy heat is transmitted by means of a flow of either a liquid medium, a gaseous medium or a powdery medium, preferably for continuously measuring thermal power of heaters, heat exchangers, radiators, refrigerators, sanitary warm-water appliances, air-conditioning plants and other heating appliances. The device is supplemented with a meter and an integrator in the electronic part. It can either be used as a meter of consumed heat energy or of supplied heat energy and/or a continuously operating mass flow meter for liquids, gases and powdery materials, when there exists a temperature difference between either the feed line and the return line, or between one of said lines and the ambient or another heat sink, respectively.

2. Discussion of the Art

Known thermal power measuring devices and heat energy meters, having movable elements for measuring the mass flow of media, wear out and are sensitive to impurities. Measuring devices without movable elements become inexact when sediments accumulate, when flow conditions alter and become turbulent and when the medium is a polyphase one. Said meters and measuring devices are not appropriate for small flows and they are only applicable for a declared medium. It is therefore an object of the invention to provide a thermal power meter and/or a heat energy measuring device, both without movable and wearable elements, and appropriate for small flows, which further are independent of accumulation of sediment and impurities, of turbulence and of the circumstance that the medium is a polyphase one, as well as applicable for various media.

It is a demanding problem to accurately measure the thermal power exchanged in a heating device by means of a liquid or gaseous medium. The mass flow and the temperature difference ($T_{inlet}-T_{outlet}$) has to be continuously measured, and one has to know the average thermal capacity, $C_p$, of the medium with this temperature region, i.e.

$$C_p \bigg|_{T_{inlet}}^{T_{outlet}},$$

in order that the basic equation for exchanged thermal power be electronically or in another manner calculated, as follows:

$$\dot{Q} = \dot{m} \cdot C_p \bigg|_{T_i}^{T_o} \cdot (T_{inlet} - T_{outlet}).$$

Contrary to the circumstance that it is, according to the present state of the art, not difficult to accurately measure the temperature differences, $\Delta T$, particularly by differential connection of sensors, continuous measurement of the mass flow, m, is very demanding in practice. Consequently, rather, volume flows are measured with consideration of the density of medium. However, if the medium is polluted, compressible, a two-phase medium (fluid plus gas bubbles or gas+droplets), or a pulsating medium, the volume flows cannot be accurately measured with ease. Measurement of smaller flows in large dimension tubes, where the velocities are low and alterable according to the cross-section, represent a special problem.

Direct volume flow meters, e.g., gasometers, are not appropriate for continuous flows, particularly when the flows are not steady ones. Indirectly measuring volume gauges, based on various wheels (Voltman's wheel), sprockets, elliptical sprockets, rings, vane runners, flaps and the like, are sensitive to impurities (axles and journals). Namely, due to impurities, sediments, corrosion and wearing-out, the clearance between the movable and the stationary elements diminishes or enlarges. Consequently the accuracy declared is reduced by the use of such gauges. The later are neither applicable for compressible media, two-phase media or at faster flow alterations.

According to the prior art, many indirectly measuring volume-flow gauges exist which measure indirectly twice, i.e., they measure a value dependent upon the velocity, the latter being dependent upon both the volume flow and the cross-section. The velocity is not constant, but varies according to the cross-section, which essentially influences the exactness of these methods. Velocity measurements by means of pressure differences at restrictors, Venturi tubes, in tube bends, etc. are of this kind. Instead of using pressure differences, the velocity is also measured by comparing the heat transmission, e.g., by means of a hot wire or a heated plug. The disadvantage of the latter methods lies in that the response is dependent upon the sensor, and further dependent upon the impurities, the temperature, turbulence, bubbles, etc., which all reduces the reliability and the accuracy of the measurements.

Lately, electronics has enabled several indirect velocity measurements, e.g., by using the Doppler effect by means of ultrasonics or laser; the measurement of passing time of Karman vortexes or of bubbles within a tube; the compensation/comparison method relating to the coefficient of heat transmission in combination with the Venturi tube; magnetostriction and induction methods; as well as axial-ionisation or radialionisation methods. Most of the measurements mentioned above require composite electronics and are only accurate under restricted, declared conditions.

To measure the thermal power, $\dot{Q}$, the gauges must also consider the thermal capacity, $C_p$, of the medium. Said thermal capacity depends upon the material, the temperature and upon the pressure as well. When computing (automatically or non-automatically) the thermal power or the heat energy exchanged within a period, mostly the density of the medium has to be considered in the measurements described above. Therefore, the errors sum up rapidly.

SUMMARY OF THE INVENTION

The substance of the invention resides in a measuring device which transforms the problem of thermal power measurement according to the prior art into a problem of measuring three temperature differences so that the influences of impurities, of turbulence, absolute temperature, bubbles, of sediments, etc., are eliminated and so that it is not necessary to know the thermal capacity, $C_p$, of the medium. This object is attained by interaction of four measures:

(1) The medium conveying the thermal energy is passed through the measuring device along a uninsulated wall through which a smaller quantity of the thermal energy (hereinafter "measuring thermal power") is delivered or drawn-off. Because of a change of enthalpy in the medium, a temperature difference results which is dependent upon the flow, the thermal capacity and the power of the exchanged measuring heat. This temperature difference is measured;

(2) To exchange the measuring power, the energy potential—the temperature difference—between the feed line and the return line, or between one of said two lines and the ambient, or between one of said two lines and another heat sink or source of heat (e.g. water piping), is used;

(3) The measuring thermal power is measured in such a manner that it is conveyed through a material of known cross-section and known thermal conductivity, into which material two or more temperature sensors are incorporated. The temperature difference between these sensors depends upon the measuring thermal power, the geometric properties and upon the thermal conductivity of the material. This temperature difference is also measured; and (4) Finally, the main temperature difference between the inlet and the outlet of the medium is measured.

The law of energy conservation leads to the conclusion that in the equation for the thermal power, Q, of the medium, the thermal capacity, $C_p$, becomes eliminated, i.e., the kind of medium passing through the measuring device is irrelevant as far as the device is concerned. Consequently, the thermal power can be expressed by means of three temperature differences and a constant which is dependent upon the construction and the material of the measuring device.

BRIEF DESCRIPTION OF THE DRAWING

By the present invention, temperature differences in the flow of a medium are measured between a feed line and a return line. The feed line and return line extend from an object whose thermal power is calculated based on the measured temperature differences. A measuring device includes a plurality of sets of temperature sensors which measure the average temperature differences along different points of the flow path of the medium.

The object whose thermal power is calculated is either a thermal energy source or a thermal energy consumer. There is a temperature difference between the flow of medium through the feed line and the return line of the object whose thermal power is calculated due to the raising of the temperature of the medium when the object is a thermal energy source or the lowering of the temperature of the medium when the object is a thermal energy consumer. The temperature sensors are sufficiently spaced apart to detect the differences in temperature along the path of travel of the medium.

The invention will be further elucidated by some examples of embodiments evident from the accompanying drawing, in which.

DETAILED DESCRIPTION OF THE INVENTION

FIGS. 1 through 16 show a series of measuring devices, the connections thereof and some details.

Figure 1:
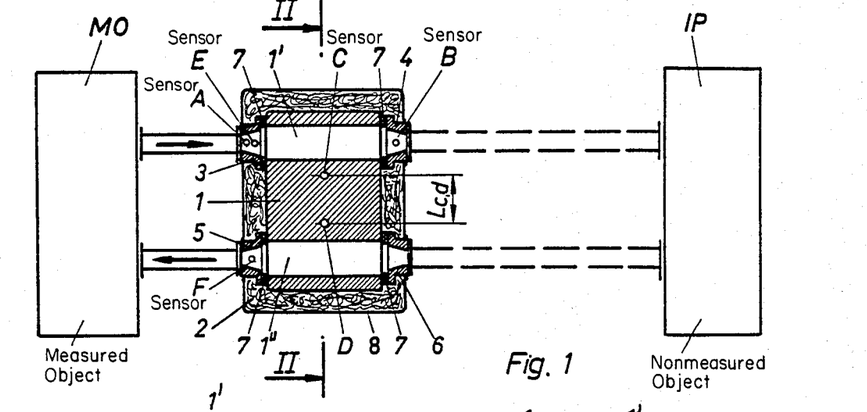
FIG. 1 is a thermal power measuring device according to the invention in schematic presentation in a longitudinal sectional view, incorporated between the object whose thermal power is measured, and the remaining part of the circuit, which in the drawing either represents a heat source or a heat consumer.

FIG. 1 shows schematically a simplest embodiment of the measuring device, wherein the measuring thermal power, i.e. the power, by means of which it is measured, is exchanged between a warmer and a cooler line to one side only, the body consisting of a single piece. From the drawing the following elements are evident:

A body 1 of the measuring device is mantled with an insulation 2 and is provided with two longitudinal channels 1', 1", which are extended in the area of the insulation 2 to connections 3,5 connected to lines from a measured object MO and thereto, and further extended to connections 4 and 6 connected to a feed line and a return line of a nonmeasured object IP which is not measured; the connections 3 to 6 are attached to the body 1 of the measuring device indirectly by interposing insulating washers 7. All elements mentioned above are outwardly enclosed in a casing 8.

A and B are sensors for sensing the temperature differences in the flow of medium between the connections 3 and 4 of the channel 1'. C and D are sensors for sensing the temperature difference (gradient) in the material of the body 1 of the measuring device between the channels 1', 1"; and E and F are sensors for sensing the temperature difference between the feed line and the return line of the measured object MO.

Figure 2:
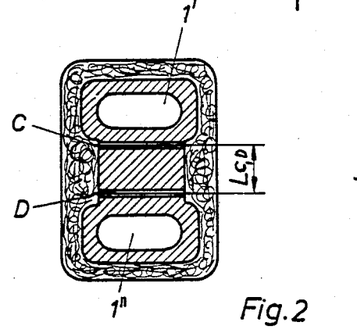
FIG. 2 is a transverse section along the line II—II of FIG. 1.

The construction of the body 1 of the measuring device of FIG. 1 is further defined in FIG. 2. However, an embodiment of the body 1 shaped as a simple block with two parallel bores located at opposite sides is also possible. The temperature sensors are arranged in the following manner: sensors A and E are located in connection 3, sensor B is located in connection 4, sensor F is located in connection 5, connection 6 is without any sensor. The sensors A, B and E, F represent sensor pairs; whereby temperature differences (not necessarily the absolute temperatures) are measured. For this reason, said sensors are differentially connected and give responses ($T_A$-$T_B$) and ($T_E$-$T_F$). The sensors are incorporated in such a manner that reliable average values are measured thereby. Several sensors can be foreseen.

Figure 3:
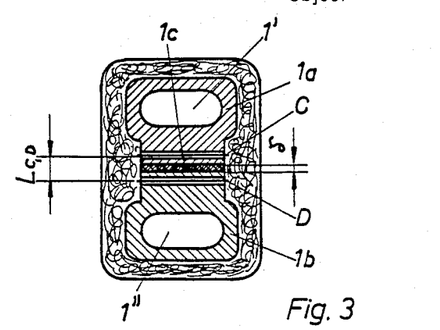
FIG. 3 is a transverse section as in FIG. 2, but of a modified embodiment.

As the measured object MO is either a thermal energy source or a thermal energy consumer and as the flow of the medium is of definite magnitude, there exists a defined temperature difference between the conducts (unless the thermal power of the measured object is zero). Due to this temperature difference some measuring thermal power is exchanged through the conducting material of the body 1 of the measuring device. The magnitude thereof depends upon the constructional dimensions of the measuring device, the conductivity of the material, the temperature difference and the flow of the medium. As the measuring thermal power is not a part of the measured thermal power, its magnitude is not essential for the measurement when the measuring device is incorporated according to the arrangement of FIG. 1. Because of conveyance of heat through the material of the body 1, there appears in the latter a temperature gradient (=temperature difference at a defined distance), which is sensed by means of a pair of sensors C and D. There can be a plurality of these sensors as well, spaced apart distance $L_{C,D}$ in such a manner that they determine an average value of the temperature gradient as reliably as possible. Because of this criteria the body 1 of the measuring device according to FIG. 2 is contracted in the area around sensors. The same effect is also obtained when the body 1 is provided with a number of bores or is otherwise made infirm, or when a less conductive layer of a thickness of δ is inserted therein as shown in FIG. 3. In the latter case the body 1 is composed of two metal parts 1a and 1b. A third layer 1c can be a glue between the parts 1a, 1b. The distance $L_{C,D}$ can be greater, equal to or smaller than the thickness δ of the layer 1c, in dependence upon the kind of the sensors C, D and the place of incorporation thereof. In dependence uon the temperature differences ($T_A$-$T_B$), ($T_C$-$T_D$) and ($T_E$-$T_F$), the sensors A, B, C, D, E and F which adequately fed yield three electric values-responses (voltages, currents, resistances, frequencies and the like, in dependence upon the kind of the sensors chosen), which responses are either indirectly measured or conveyed into an electronic unit, whereupon the measured thermal power is determined by the following equation:

$$\dot{Q} = k \frac{(T_C - T_D) \cdot (T_E - T_F)}{(T_A - T_B)} \text{ (kW)}.$$

In order to obtain more convenient dimensions of the measuring device, the internal surfaces along which the medium flows are ribbed (details will be evident from the embodiments). However, this feature is not mandatory particularly in cases of long small-diameter tubes. In principle, the shape of the hollows in the body 1 of the measuring device, in the given case the shape of channels 1', 1", through which the medium flows, is optional and designed so that the thermal flow per cross-section unit between the sensors C and D is uniform. The connections 3, 4, 5 and 6 can be component parts of the body 1 of the measuring device (made of one piece). However, the measuring device is preciser when said connections are fastened to the body 1 by interposing thermal insulating washers 7. The measuring device is mantled with the insulation 2 to thereby reduce thermal losses into the ambient which improves the accuracy. However, insulation is not always necessary.

Figure 9:
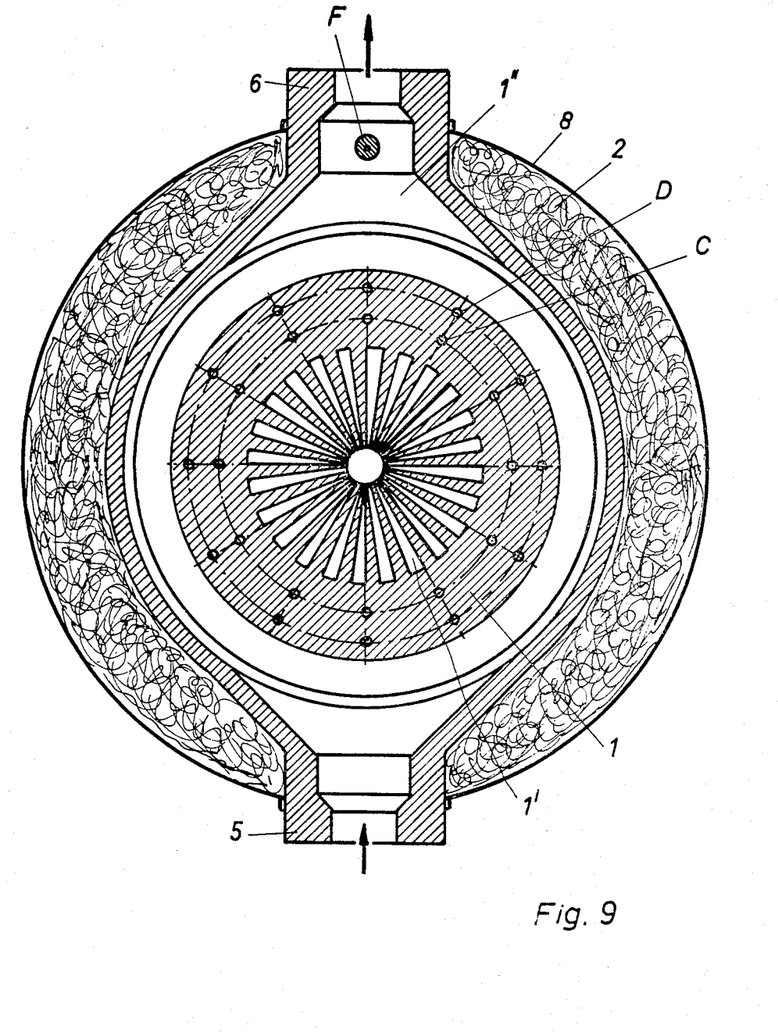
FIG. 9 is a section along the line IX—IX of FIG. 8.

The body 1 of the measuring device can further be shaped so that the heat does not pass in one direction only, but passes in two directions (e.g. embodiment of FIG. 4) or in several directions. The limiting case is an embodiment with concentrically arranged elements which are symmetrical about an axis, wherein the measuring thermal power is conveyed in all radial directions (FIG. 9). A ball-shaped embodiment can technologically hardly be realized, but it is theoretically possible.

Figure 4:
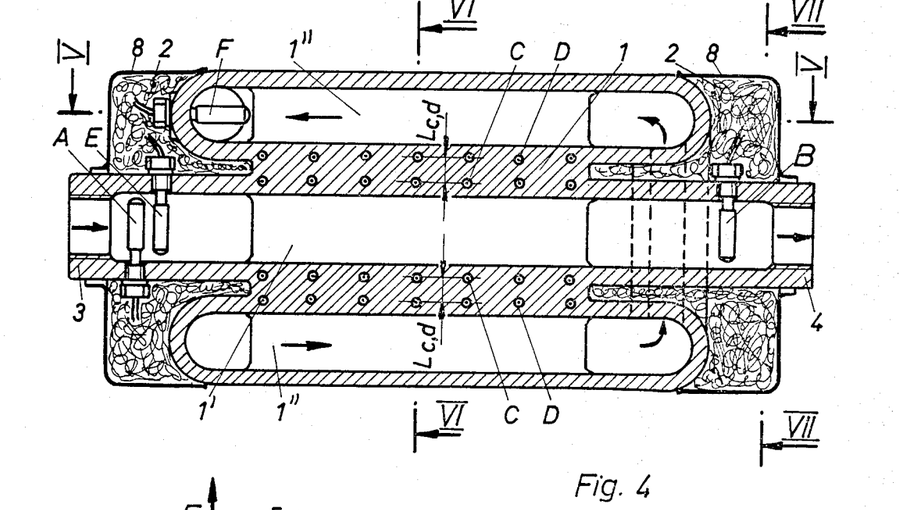
FIG. 4 is a longitudinal sectional view of a further embodiment.
Figure 5:
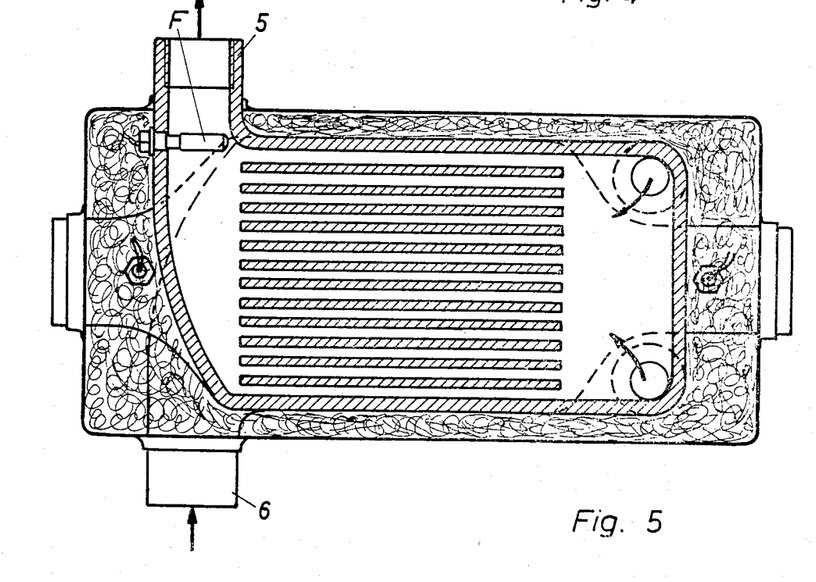
FIG. 5 is a longitudinal section along the line V—V of FIG. 4.
Figure 6:
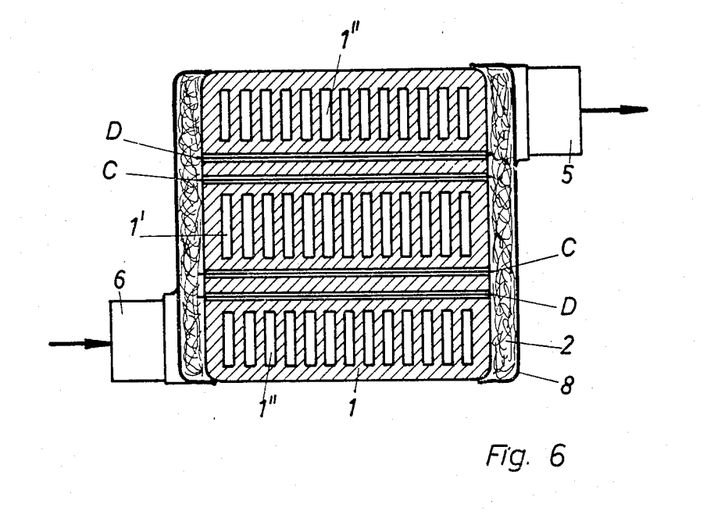
FIG. 6 is a transverse section along the line VI—VI of FIG. 4.
Figure 7:
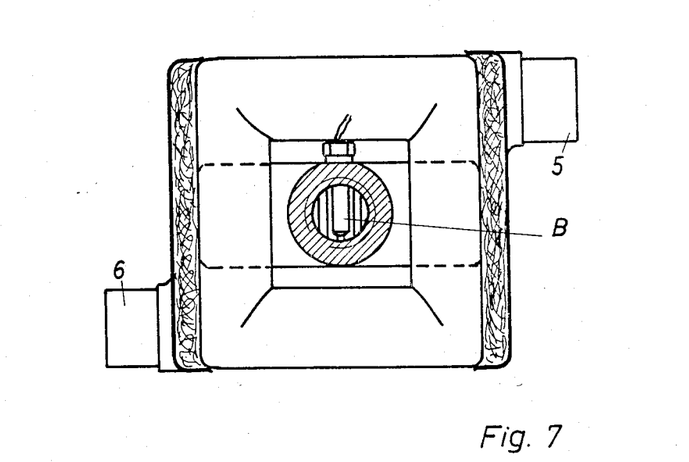
FIG. 7 is a further transverse section along the line VII—VII of FIG. 4.

The measuring body 1 in the embodiment of FIG. 4 is made of one piece, the connections 3 to 6 included. It is shown as a cast piece. The measuring thermal power is conducted in two directions. The surfaces along which the medium is conveyed in one or the opposite direction are ribbed, which is clearly evident e.g. from FIG. 5. The incorporation of the measuring device is the same as that of FIG. 1. The measured object MO is connected to the connection 3, where the sensors A and E are arranged, and to the connection 5, where the sensor F is arranged. The nonmeasured object IP is connected to the connection 4, wherein the sensor B is arranged, and to the connection 6, which has no sensors. In principle, the warmer line is connected to the sensors A, E and B so that the thermal losses to the ambient are as low as possible and so that they exert as little influence as possible on the measurement. With good insulation the arrangement may work in the opposite way. In the latter case, the cooler medium enters at the outer lower side (due to simpler ventilation) through the connection 5 and flows along the ribs to the other end of the body of the measuring device. Subsequently, it is conveyed through a pair of holes to the upper side and leaves the measuring device past the ribs at the sensor F (connection 5). The connections can further be formed so that the outer flow is parallel on both sides, but this is not essential for the operation of the measuring device. The measuring thermal power conveyed through the ribbed surface of the flow channels 1', 1" to the body 1 of the measuring device is conducted outwards in two directions, upwards and downwards in FIG. 4. The thermal flow is sensed by sensors C, D incorporated on both sides of the intermediate channel 1' into bores which are parallel to the surface of the roots of the ribs and perpendicular to the axis, at a distance of $L_{C,D}$. Said sensors could alternately be arranged in parallel to the axis. The number of sensors C, D depends upon the desired accuracy with which the average temperature gradient should be measured. There can be an embodiment with two parts of sensors only, one pair on each side.

The sensors forming one pair are connected differentially, whereas the responses of a series of pairs are added up or the average value is electrically determined in another way.

Analogously to the embodiment of FIG. 1, the sensors A, B measure the temperature difference appearing in the flow of medium due to the exchanged measuring thermal power. The sensors E, F measure the temperature difference between the inlet and the outlet of the measured object. Analogously to the first embodiment, thermal power is determined by means of the responses and therefrom, by time integration, the heat quantity consumed or produced in the measured object within a given period.

In the latter embodiment the sensors A, B and E, F are represented as sleeves screwed into the connections 3, 4 and 5. Temperature sensitive elements (thermocouple elements, resistors, diodes, integrated circuits, condensers etc.) are inserted into the sleeves, which are embedded by casting to achieve higher durability. The sensors can also be made in another manner according to the practice in heating technology.

The interconnection between both sides, in FIG. 4 between the upper and the lower channel 1', is realized by means of symmetrically located upright holes made at casting. Between the walls of the connection with the cooler medium and between the walls with the warmer medium, there should be no material of high conductivity, but an insulation (as shown). When there is such a material, the sensors C, D have to be provided as well in order to consider the part of the measuring thermal power exchanged in said areas. The measuring thermal power is allowed to be conducted only in the areas, where the conducting is measured.

As in the embodiment of FIG. 1, the connections as well as the connecting holes between the outer sections of the embodiment of FIG. 4 can be composed of separate elements instead of being cast in one piece. Washers of low conductivity are inserted between them to increase the accuracy of the measuring device. The body 1 as such a measuring device can also be composed of a number of pieces with an interposed layer in the area between the sensors C, D and provided with bores or cross-sectional contractions. The gradient ($T_C$-$T_D$) is thereby increased or the average is improved, as has already been explained at analyzing FIGS. 1 and 3. In this embodiment the insulation is less necessary than in FIG. 1. The thermal losses which influence the accuracy of the measurement are only possible on the sides, i.e. on a smaller section of surface.

Figure 8:
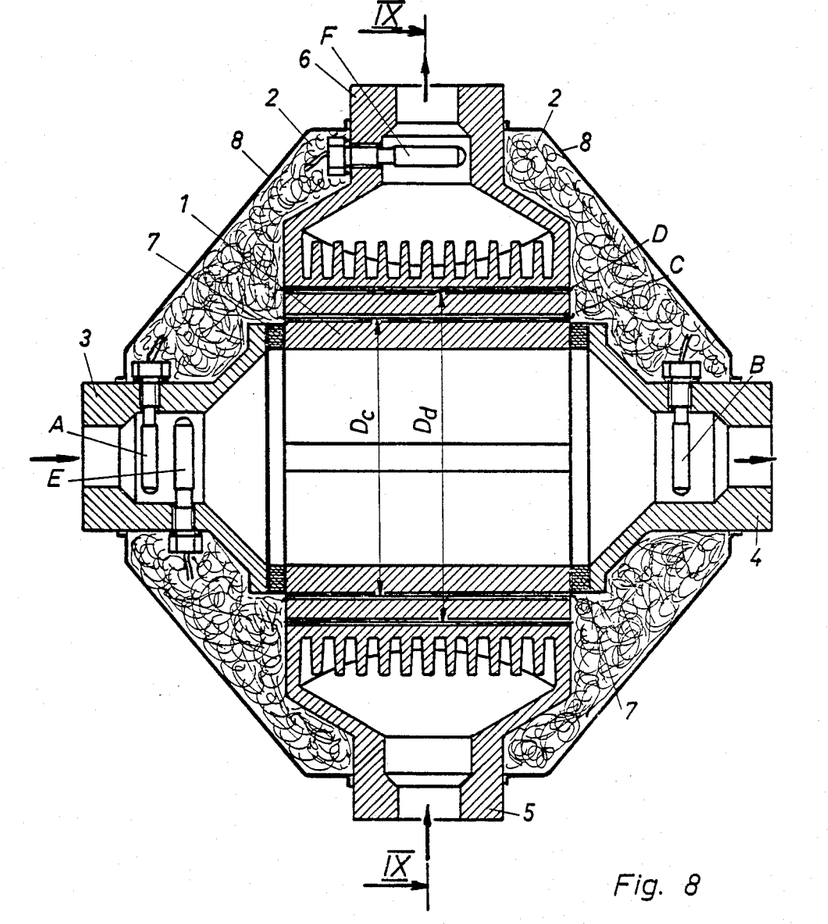
FIG. 8 is a sectional view of a still further embodiment of the thermal power measuring device, symmetrical about an axis.

FIG. 8 shows a further embodiment of a measuring device with concentric elements, one being externally ribbed and the other one being internally ribbed, the embodiment being symmetrical about an axis. This measuring device can also operate without ribs provided it is essentially longer. The body 1 of the measuring device is made of one piece including both connections 5 and 6. The connections 3 and 4 are separate elements attached to the body 1 of the measuring device by means of thick insulating washers 7. The flow of the outer medium (connections 5, 6) is divided to two parallel streams and flows along ring-shaped outer ribs of the body 1. Instead of a parallel dividing of flow of the medium another form can be chosen, i.e. the form of a helix. The mentioned dividing is the simplest one. In principle, the warmer branch is connected in the middle for the reasons explained above. In this case, the measuring thermal power is conducted through a cylindrical wall, which has been considered in the constant in the equation defining $\dot{Q}$. Said measuring thermal power is measured by sensors C, D inserted in two series on different diameters ($D_C \neq D_D$). In FIG. 8, a resistance wire is shown as a sensor element and is inserted into bores in parallel with the axis. Any of the aforementioned sensor arrangements are possible. When the body 1 is composed of two or more elements, the resistance wire can simply be coiled on the circumference. A limiting case of a concentrically composed embodiment of a measuring device is the case where a tube is arranged in another tube provided with intermediate layers for measuring the gradient. The functioning, the construction and the incorporation of the sensors in FIG. 8 are analogous to those of FIG. 4.

Figure 10:
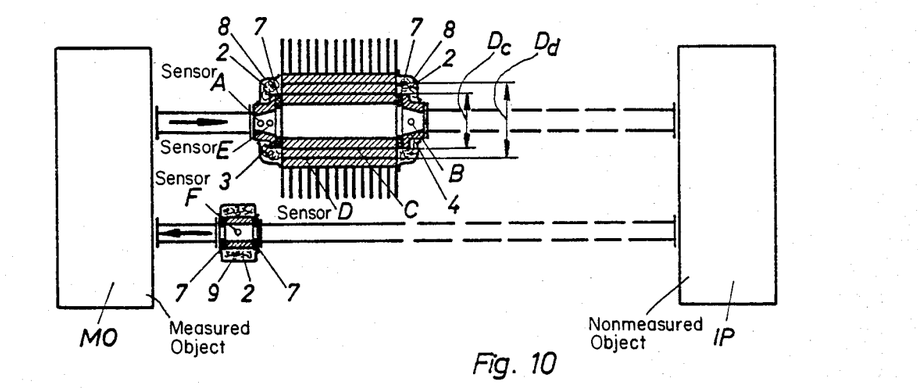
FIG. 10, similarly to FIG. 1, is a situation wherein is incorporated a further thermal power measuring device according to the invention.
Figure 11:
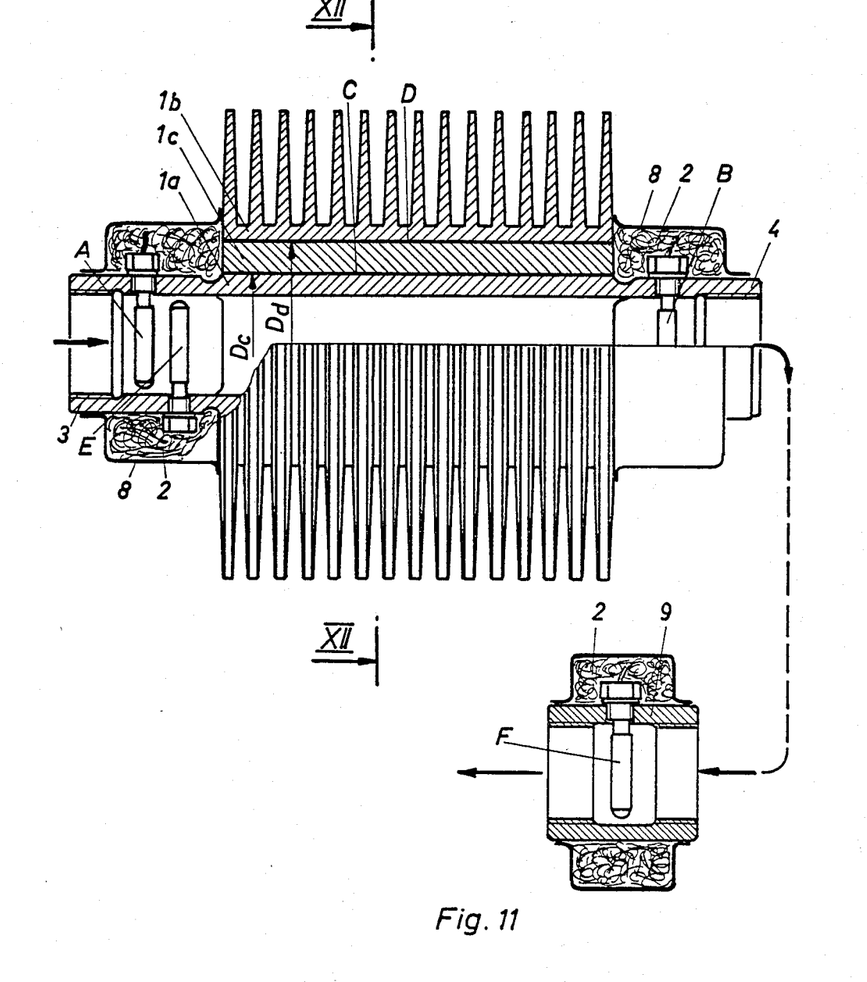
FIG. 11 is a longitudinal sectional view of the thermal power measuring device of an arrangement of FIG. 10.
Figure 12:
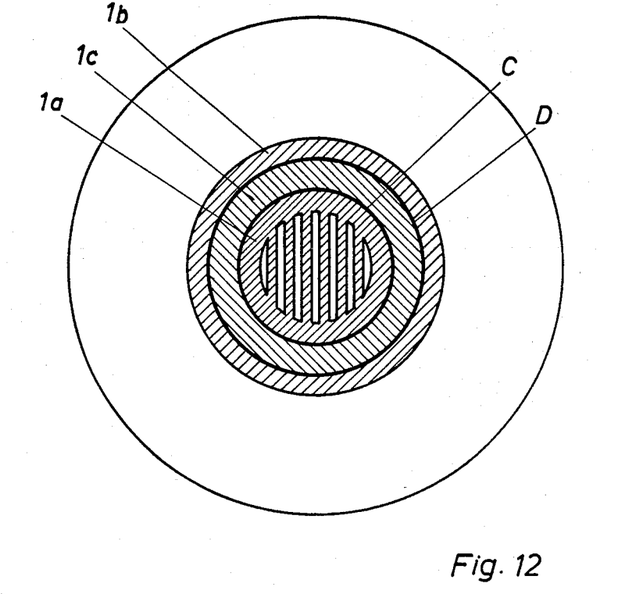
FIG. 12 is a transverse section along the line XII—XII of FIG. 11.

In the preferred embodiment, FIG. 10 shows schematically and FIG. 11 shows in more detail an embodiment of a measuring device wherein the measuring thermal power is conducted into the ambient. Contrary to the above-mentioned embodiments, the measuring device of FIG. 10 does not return the measuring thermal power to the cooler line, but to the ambient. The connections and the functioning are analogous to the preceding solutions, the essential difference lying in that the measuring thermal power is exchanged until there prevails a temperature difference between the medium flowing through the measuring device and the ambient, regardless of the temperature difference between the warmer and the cooler flow of the medium. The equation defining $\dot{Q}$ remains unchanged. The connection with the sensor F acts as for the previous connections 5 and 6, and is generally located separately from the main measuring device. It is therefore provided with a special reference number 9 in FIGS. 10 and 11. For better accuracy, it is mantled with the insulation 2. The body of the measuring device can either have ribs on the outer surface only, or on both surfaces (as shown), or not at all, depending upon the length allowable for the measuring device, upon the flow area and upon the absolute temperatures. The sensors C, D are formed as layers (method of printed resistors, of evaporation deposition, and the like).

The application of the measuring device of FIG. 10:

When the measuring device of FIG. 10 or FIG. 11 is used, however, without the sensor F, the sensor E measures the temperature difference relating to a reference temperature (e.g. 20° C.), which can be simulated by means of an independent element corresponding to the sensors and incorporated into the measuring device or elsewhere. Such a measuring device can also be used at a non-existent return line. Examples are sanitary warm water and heating with warm air. The thermal power determined by the formula:

$$\dot{Q} = k \cdot \frac{(T_C - T_D) \cdot (T_E - T_{ref})}{(T_A - T_B)}$$

represents the thermal power of the measured flow with respect to the reference temperature.

Figure 13:
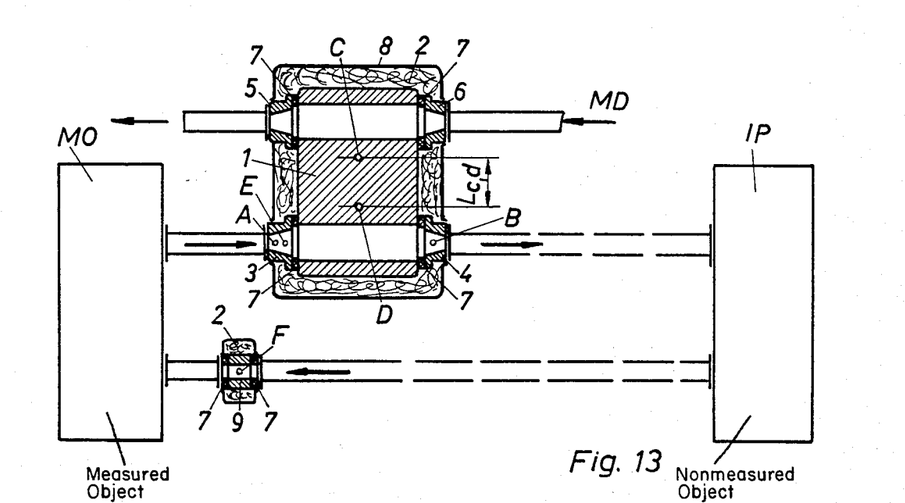
FIG. 13 is a combination of the arrangements of FIGS. 1 and 10.

FIG. 13 shows a modified thermal power measuring device according to FIG. 1, wherein the measuring thermal power is conducted to an alternative consumer or from an alternative source of heat energy (examples: the water piping for the first embodiment; burned gases for the second embodiment). The "alternative" source or consumer of the thermal power is indicated by MD in FIG. 13. In addition to the measuring device as represented, any embodiment of FIGS. 1 through 9, could be used so long as the sensor F is removed from the measuring device and is incorporated into the return line (as in the arrangement of FIGS. 10 or 11, respectively), the connections 5 and 6 being connected to the above-mentioned "alternative" source or to the consumer of the thermal power. For the operation of the measuring device, a temperature difference between the medium in the measuring device and the medium flowing through this second source or consumer must be given.

Application of any embodiment of the proposed measuring device to measure mass flow:

A special case is the use of any of the proposed embodiments without the pair of sensors E, F for measuring mass flow of a medium, the thermal capacity of which is known. The following formula is used:

$$\dot{m} = \frac{k}{C_P} \cdot \frac{(T_C - T_D)}{(T_A - T_B)},$$

the arrangement being analogous to the previous examples, the only difference lying in the electronic unit which, has to calculate the measured mass flow from the responses, if the measurement is not manually performed.

Figure 14:
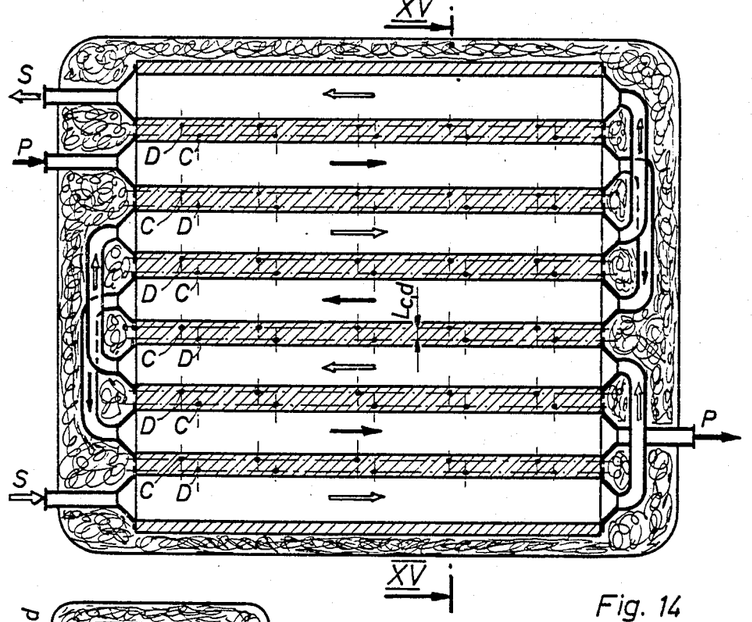
FIG. 14 is a longitudinal sectional view of a plate-shaped thermal power measuring device according to the invention.
Figure 15:
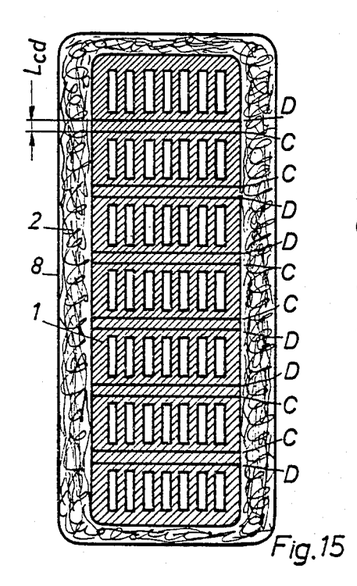
FIG. 15 is a transverse section along the line XV—XV of FIG. 14.
Figure 16:
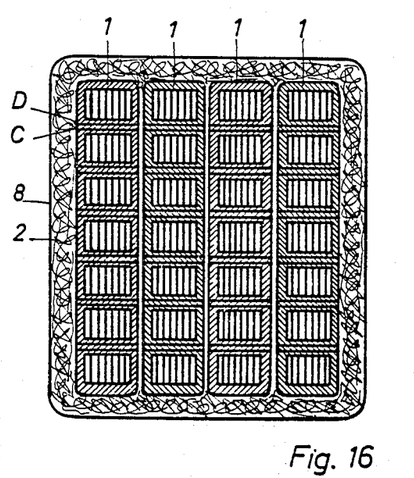
FIG. 16 is a modified embodiment using elements of FIGS. 14–15.

Application of the measuring device of any embodiment arranged according to FIGS. 10 and 13, but without the element 9 and the sensors A, B, E and F:

Only sensors C and D are used. Such a measuring device is practical when the media are separated and the total thermal power exchanged in the measuring device itself is measured. For this application, the embodiment of FIG. 4 is the most appropriate and is enlarged to a cascade panel, as schematically shown in FIGS. 14 and 15. A number of such panels connected either in parallel or in a series, as shown in FIG. 16, can be used. According to this application, the measuring device is enlarged until the measuring thermal power equals the measured one. The measuring device becomes a heat exchanger between two separated media indicated with P and S in FIG. 14, the device being embodied so that the heat can only be exchanged through the cross-section, where the thermal flux is measured by the sensors C and D in the manner already disclosed. As the medium delivers or receives the total thermal power, which is measured in the measuring device itself (and not in the measured object as above), the temperature in the theoretical location of the sensor B equals the temperature of the presumable location of the sensor F, whereas the temperature of the sensors A and E in any case represent the same measured point. The sensors A, B, E and F are not necessary. Proceeding from the above-mentioned formula defining $\dot{Q}$, one obtains:

$$\dot{Q} = k \cdot \frac{(T_C - T_D) \cdot (T_E - T_F)}{(T_A - T_B)} = k \cdot (T_C - T_D).$$

The thermal power exchanged in the measuring device between two separated media is totally measured from the temperature gradient by means of one pair or several pairs of sensors C, D, the responses of which are added up and taken from individual cascades and panels.

The measuring device according to this arrangement covers the functions both of a heat exchanger and of a thermal power measuring device. If it is enlarged with an electronic unit integrating in a defined time interval, the proposed measuring device thus covers the functions both of the heat exchanger and of the device for measuring exchanged quantity of heat energy in a defined period of time (=heat meter). The measuring device can be ribbed, formed with cascades, be flat or be concentric, so long as the above-mentioned remarks are considered. The object of the invention is thus attained. There are no movable elements, impurities and sediments do not influence the measurement, it is irrelevant which of the two media exchange the heat, and the measuring device is also practical for very small flows.

When a cascade embodiment like the one of FIGS. 14 and 15 is used, it is preferable to arrange the medium, whose thermal losses through the insulation into the ambient do not represent a measurement error in the outer sides, i.e., the cooler medium, if the quantity of the heat delivered by the warmer medium is measured; or the warmer medium, respectively, if the quantity of the heat received by the cooler medium is measured.

ADVANTAGES ACHIEVED BY THE INVENTION

With the exception of the sensors, the proposed measuring device can be made in one piece. It can also be cast. The embodiment of FIG. 10 is particularly appropriate for continuously measuring the heat energy used in individual radiators or in single-line systems because of its properties, it is formed as a radiator segment. In the absence of movable elements, a high-quality incorporation of sensors, i.e. sensors cast into the material and having no contact with the medium or the atmosphere is possible in which lifetime is not limited and no special maintenance is necessary. Sediments, corrosion, bubbles, etc., do not influence the result of measurement, the heat transmission not appearing in the basic formula. The measuring device uses energy for measuring the temperature differences only. In combination with an adequate electronic circuit, this represents a very low consumption. The consumption can even be zero for the reading itself, if thermocouple elements are used as sensors. The measuring method is also appropriate for very low powers as the measuring device can be a miniature embodiment. The disclosed measuring device can also be used in laboratories and in control systems, as well as for various media: water, air, oil, cooling agents, etc.

I claim:

1. A thermal power measuring device for measuring the thermal power and/or the quantity of heat in the total flow of a fluid medium through a thermal energy source or a thermal energy consumer means by a temperature gradient measurement, and the functioning of the thermal power measuring device is independent of the magnitude of the temperature difference in the medium, independent of fluctuations in the aggregate condition of the medium, such as particle content, and without requiring a knowledge of the specific heat of the medium, said thermal power measuring device comprising:

three coaxially mounted tube-shaped elements including an inner tube-shaped element, an intermediate tube-shaped element, and an outer tube-shaped element establishing a thermal path from the interior of the inner element to the exterior of the outer element, said inner element having a plurality of longitudinal ribs spaced along the interior surface thereof and said inner element having an inlet connection at one end thereof and an outlet connection at the other end thereof through which the medium flows and whose thermal power is measured, said outer element having a plurality of radial, ring-shaped ribs spaced along the exterior surface thereof such that the thermal power is assisted to dissipate radially outwardly across said three tube-shaped elements into the ambient environment;

a first temperature sensor located in said thermal path between the inner element and the intermediate element;

a second temperature sensor located in said thermal path between the intermediate element and the outer element, said sensors cooperating to produce a signal representative of said temperature gradient measurement; and a measuring means for determining the measured thermal power based upon the temperatures measured by said first temperature sensor and said second temperature sensor.

2. A thermal power measuring device according to claim 1, wherein the device further comprises a pair of temperature sensors, which sensors are located within said inlet connection of said inner element and are located spacially with respect to one another such that the flow of medium passes first by one and then by the other of the pair; and an outlet temperature sensor which is positioned in said outlet connection of said inner element.

3. A thermal power measuring device according to claim 1, wherein the thermal power is conducted to a consumer means thereof.

* * * * *